United States Patent Office 3,392,155
Patented July 9, 1968

3,392,155
LOW MOLECULAR WEIGHT MALEIC COMPOUND COPOLYMERS PARTIALLY ESTERIFIED WITH MONOHYDRIC POLYETHER ALCOHOLS
Irving E. Muskat, Miami, Fla., assignor to Sinclair Research, Inc., New York, N.Y., a corporation of Delaware
No Drawing. Continuation-in-part of application Ser. No. 129,981, Aug. 8, 1961. This application Aug. 19, 1966, Ser. No. 573,462
11 Claims. (Cl. 260—78.5)

The present application is a continuation-in-part of copending application S.N. 129,981, filed Aug. 8, 1961, now U.S. Patent No. 3,342,787.

The present invention relates to very low molecular weight partial esters of copolymers of monovinyl aromatic compounds, especially styrene, with maleic compounds to provide products which possess greatly improved solubility in aqueous media to provide aqueous solutions of lower solution viscosity or higher resin solids content. The invention includes the new partial esters per se and the aqueous solutions which are produced therefrom.

Copolymers of styrene and maleic compounds including maleic anhydride, maleic esters and maleic partial esters are known, but these possess only limited solubility in aqueous media even aqueous alkaline media as typified by water solutions of ammonium hydroxide, and concentrated low viscosity solutions are not obtainable from these known copolymers. If a substantial portion of the carboxyl groups available in the copolymer are esterified with alcohols, the number of carboxyl groups available to participate in solubilization is still further reduced. Still further, as the proportion of styrene or other monovinyl aromatic compound in the copolymer is increased, available carboxyl reactivity is decreased and solubility in such aqueous media is, again, made more difficult. The invention includes the provision of aqueous-soluble partial esters of low molecular weight copolymers in which the molar ratio of styrene, for example, to maleic compound is in excess of 1:1.

From the standpoint of known heteropolymers of maleic anhydride and styrene, even without partial esterification, these have not been sufficiently soluble to make solutions containing more than 40% heteropolymer, regardless of solution viscosity. In the present invention, water solutions can be provided which contain more than 40% of dissolved styrene-maleic anhydride copolymer. Indeed, liquid solution products may be obtained which contain the anhydride copolymer dissolved in aqueous ammonium hydroxide up to concentrations of about 60-70% by weight, based on dissolved resin solids. The invention resides primarily upon the discovery that partial esters of copolymers of vinyl aromatic compounds and maleic compounds of very low molecular weight, e.g., those possessing a solution viscosity of up to 2.0 centistokes, and especially those possessing a solution viscosity of up to 1.0 centistoke, in a solution of 10 grams of copolymer diluted to 100 milliliters of solution with acetone, can be esterified with monohydroxy polyoxyalkylene glycols having a molecular weight of at least about 120 to provide partial esters which possess improved chemical resistance and which are internally plasticized while, at the same time, exhibiting extensive solubility in water, either alone or in the presence of water soluble alkaline agents, typically ammonium hydroxide.

The art has also experienced difficulty in the production of partial esters of maleic compound-containing copolymers because the esterification reaction in the absence of catalysis does not, in many instances, proceed to a sufficient extent. Moreover, conventionally used esterification catalysts are injurious to the ester product requiring purification to eliminate catalyst residues.

It has been found that metal salts of fatty acids, and especially the alkali metal salts, are effective esterification catalysts to promote the rapid reaction of carboxyl-containing copolymer and alcohol even in the absence of extraneous solvent, and that these salts do not injure the ester product for many uses so that purification of the product becomes unnecessary.

As previously indicated, the partially esterified copolymers of the invention are heteropolymers, i.e., they are of random, rather than block or graft configuration, of maleic compounds with monovinyl aromatic monomers. Desirably, the copolymer is first formed by copolymerizing the monovinyl aromatic monomer with a maleic anhydride to provide an anhydride copolymer which is then partially esterified with the monohydric polyether alcohol.

The term "maleic anhydride" identifies anhydrides having the formula:

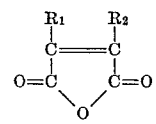

in which $R_1$ and $R_2$ are selected from the group of hydrogen, alkyl, aryl and aralkyl radicals containing up to 8 carbon atoms, and halogen. Thus, maleic anhydride, methyl maleic anhydride, phenyl maleic anhydride, dimethyl maleic anhydride and chlormaleic anhydride are particularly contemplated. Maleic anhydride is preferred.

Various vinyl aromatic monomers may be used, especially styrene and vinyl toluene, but other substituted styrenes may be used such as ring-alkylated styrene compounds such as the vinyl xylenes, and p-isopropyl styrene, these being illustrative of $C_1$–$C_4$ alkyl-substituted products. Halogen-substituted styrenes may also be used in which up to five of the nuclear hydrogen atoms are replaced by chlorine, fluorine or other halogen. Vinyl naphthalene may also be used.

The preferred starting copolymers are low molecular weight copolymers of styrene and maleic anhydride in molar proportions of from 1:1 to 5:1, preferably from 1:1 to 3:1. These copolymers contain an average of at least two anhydride groups per molecule. By low molecular weight is meant copolymers, especially those of styrene and maleic anhydride, having a solution viscosity in 10% solution in acetone of up to 2.0 centistokes, preferably up to 1.0 centistoke, and most preferably up to 0.7 centistoke. All solution viscosities are measured at 30° C. and a 10% solution designates 10 grams of copolymer dissolved in acetone to form 100 milliliters of solution.

The preferred copolymers may be terminated by a chain terminating solvent which may be an alkyl-substituted aromatic organic compound in which the alkyl-substituent provides an active hydrogen atom. Desirably, the alpha carbon atom is hydrogen-substituted as in an isopropyl substituted benzene. In case of ketone solvents, the terminating group may contain the ketone radical.

A more extensive description of preferred low molecular weight copolymers useful as base or starting copolymers in accordance with the invention and the production thereof is contained in my copending application Ser. No. 849,706, now U.S. Patent No. 3,085,994, and application Ser. No. 849,704, both filed Oct. 30, 1959, and these disclosures are hereby incorporated by reference. A more extensive description of preferred low molecular weight copolymers containing larger proportions of styrene is contained in my copending application Ser. No. 129,990 filed Aug. 8, 1961.

The copolymers which are produced contain a plurality (at least two) of maleic anhydride residues which are subject to esterification, each anhydride group being capable of forming a pair of ester groups upon reaction with the monohydric polyether alcohols. Since there are usually several anhydride groups per copolymer molecule, the extent of esterification may be expressed as a percentage of half esterification. Thus, esterification of 1 equivalent of anhydride in the copolymer with 0.5 mol of alcohol provides a 50% half-ester, or esterification at 25% of the total number of carboxyl carbon atoms in the polymer; esterification with 1 mol of alcohol provides a 100% half-ester, or esterification at 50% of the total carboxyl carbon atoms; esterification with 1.5 mols of alcohol provides 150% of half-esterification, or esterification at 75% of the total carboxyl carbon atoms; and esterification with 2 mols of alcohol provides 200% of half-esterification (the bis-ester), or esterification at all of the carboxyl carbon atoms in the polymer. Since the low molecular weight anhydride copolymers may include significant proportions of chemically bound terminating solvent, the anhydride content of the copolymer should be determined by accurate titration and not estimated from the proportions of reactants used in making the copolymer.

The monohydroxy polyoxyalkylene glycols used as the esterifying ether alcohols in the present invention have molecular weights in the range of about 120 to 10,000, preferably above about 250 up to about 1200. Especially suitable are those ether alcohols corresponding to the general chemical formula:

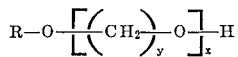

wherein R is selected from the group consisting of alkyl (including cycloalkyl), aryl, aralkyl and alkaryl hydrocarbon radicals of about 1 to 25, preferably 1 to 16, carbon atoms, especially lower alkyl; $y$ is about 2 to 6, preferably 2 to 3; and $x$ is 2 to 150, preferably 3 or even 4 to 20. As examples of these polyether alcohols may be mentioned diethylene glycol monobutyl ether, diethylene glycol monoethyl ether, butoxy ethoxy propanol, polyethylene glycol monoethyl ethers of, say, 300 to 400 molecular weight etc. Methods of preparing these ether alcohols are well known. Thus, for example, polyethyleneglycol monohydrocarbyl ethers can be prepared by condensation of two or more moles of ethylene oxide with one mole of a primary, secondary or tertiary, aliphatic or aromatic, monohydric alcohol, such as nonylphenol, oxo-alcohols, etc.

The extent of partial esterification is of secondary importance to the invention. At the lower extreme, partial esterification with the monohydroxy polyoxyalkylene glycols must proceed to an extent sufficient to provide at least about 1%, often at least about 10%, of half esterification for internal plasticizing. In most instances, but not in all instances, half esterification must greatly exceed 1% or even 10%, to provide desired inertness in the absence of a cross-linking cure. At the upper extreme of partial esterification, it is generally unnecessary to provide more than about 120 or 150% half-esterification of the maleic compound present in the copolymer, although more extensive esterification, if practicable, is also contemplated. As stated above, the preferred copolymers are those wherein about 5 to 60 or 75% of all the carboxyl carbon atoms are esterified with the monohydroxy polyoxyalkylene glycol. The remaining carboxyl carbon atoms can be in anhydride configuration, hydrolyzed to give a free carboxylic acid radical or esterified with a dissimilar alcohol, i.e., other than the above-defined monohydroxy polyoxylakylene glycol, such as an ether glycol, e.g., butyl Cellosolve, or an aliphatic alcohol, e.g., n-propanol, etc.

To illustrate the ranges of partial esterification useful for different purposes, a copolymer of styrene and maleic anhydride in mol proportions of 1:1 (molecular weight of 1600), can tolerate partial esterification of up to about 145% of half esterification while retaining extensive solubility in aqueous alkaline medium. Above 145% of half esterification, solubility diminishes in the case of those copolymers which are esterified with relatively low molecular weight, i.e., short chain, polyether alcohols. Nevertheless, the copolymer esters remain soluble in aqueous alkaline medium and the solubility which is achieved is far greater than that which could hitherto be obtained. Thus, there may be placed in aqueous alkaline solution copolymer partial esters having a very small residual carboxyl content and which are, therefore, substantially inert to water. Where higher molecular weight polyether alcohols, e.g., methoxy polyoxyethylene glycol ethers of about 300 or more molecular weight, are employed as the esterifying polyether alcohols the water-solubility of the copolymers may, contrarily, increase as the extent of esterification increases and approaches complete, or bis-esterification.

A copolymer of styrene and maleic anhydride in mol proportions of 2:1 (molecular weight of 2000), can be thermoset by reaction with glycol. Half esterification of this copolymer up to 50% and somewhat higher provides partial esters which will still thermoset with glycols. Half esterification of from 80–116% provides thermoplastic products which do not thermoset in the presence of glycols under normal molding conditions. All of these partial esters up to about 116% of half esterification are extensively soluble in aqueous alkaline medium. With still further half esterification above 116%, aqueous alkaline solubility diminishes where the shorter chain polyether alcohols are used, but dilute solutions can still be formed and are useful, especially for depositing thermoplastic films which are insensitive to water. Once again, water solubility may be observed to increase, rather than diminish, if longer chain polyether alcohols are employed as the esterifying alcohol.

A copolymer of styrene and maleic anhydride in mol proportions of 3:1 (molecular weight of 1500) is still curable with glycol. Half esterification of such copolymers up to 75% and somewhat higher can be effected without destroying good solubility in aqueous alkaline medium. With still greater amounts of half esterification, aqueous alkaline solubility diminishes for the shorter chain polyether alcohol esters, but the products are still useful and soluble in aqueous alkaline solution.

It may be surprising to note the high proportions of styrene which may be present since copolymers containing 2 or more mols of styrene per mol of maleic anhydride have not previously been considered to be producible. Nevertheless, such copolymers can be prepared and are the subject of my application Ser. No. 129,990, filed Aug. 8, 1961, the disclosure of which is hereby incorporated by reference.

The alkaline materials which may be used in the aqueous alkaline media in which the copolymer esters are dissolved are monovalent bases which may, desirably, be selected from the group of ammonium hydroxide, lower alkyl-substituted derivatives of ammonium hydroxide, lower alkyl amines, morpholine, and alkali metal hydroxide or salt which generates the same. The specific alkaline material which is selected is not a primary feature of the invention. Ammonium hydroxide is particularly preferred. Nevertheless, the other alkaline materials noted are also useful. Suitable lower alkyl-substituted derivatives of ammonium hydroxide are monoethyl ammonium hydroxide, diethyl ammonium hydroxide, triethyl ammonium hydroxide and tetramethyl ammonium hydroxide. Among the alkali metal hydroxides, sodium hydroxide, lithium hydroxide and potassium hydroxide are illustrative and quite useful in accordance with the invention. Salts such as sodium, ammonium, lithium, potassium and carbonates and their bicarbonates which generate the corresponding hydroxides in situ may also be used. Suitable amines are ethyl amine, diethyl amine and triethyl amine. Alkanolamines are also effective. For many coating purposes, it is desired that the alkaline material used in the formation of the water soluble copolymer salt be volatile so as to be eliminatable upon application of the coating composition. In such instances, volatile nitrogenous bases are preferred, especially ammonium hydroxide.

The proportion of alkaline material required to effect dissolution will vary somewhat depending upon the specific copolymer which is selected. At the very minimum, the water solution should have a pH of at least 4.0, normally of at least 6.5 and desirably all of the carboxyl groups in the copolymer are neutralized providing a water solution having a pH in the range of from 7–9. The presence of excess alkaline material is, in general, not detrimental and the use of an excess facilitates dissolving of the copolymer although it results in a water solution of alkaline pH. The solutions are prepared by dissolving the partially esterified copolymer in water containing dissolved monovalent base when necessary or desired. Moderate heat may be used to facilitate dissolving of the copolymer.

As will be evident, the extent of solubility and the viscosity of the solution which is produced will depend upon many factors, such as the proportion of monovinyl aromatic compound in the copolymer, the molecular weight of the copolymer, the extent of esterification and the particular polyether alcohol which is selected for esterification. In preferred combinations, solubility in water or in aqueous alkaline medium is remarkably extensive, providing solutions which are either far more concentrated than could heretofore be produced or of far lower viscosity at any given concentration of dissolved resin solids.

The invention is illustrated in the examples which follow:

Example I

A kettle of 30 gallon capacity, provided with agitation equipment, a jacket adapted to provide heating or cooling and a reflux condenser was charged with approximately 7 gallons of p-cymene which was then heated to the boiling point (about 176° C.).

In a separate tank, approximately 17.6 pounds of maleic anhydride briquettes were dissolved in approximately 13 gallons of p-cymene. The maleic anhydride-p-cymene solution was heated to 53° C. and after the briquettes disappeared the solution was filtered to recover ¾ pound of insoluble maleic acid. Approximately 18.3 pounds of styrene monomer were added to the clear filtrate, representing approximately 1% excess by weight over a 1:1 molar ratio of styrene to maleic anhydride. After stirring to produce a homogeneous solution and cooling to 48° C., 390 grams of benzoyl peroxide were added and dissolved by stirring to provide approximately 2.4% benzoyl peroxide by weight of total monomers present.

The monomer-containing solution was added to the boiling p-cymene in the kettle at the rate of about 3 gallons per minute, the p-cymene solvent being maintained under active reflux. The copolymerization reaction was substantially instantaneous. After the 15 gallons of monomer-containing solution had been added, the molten mass of heteropolymer product which formed within the kettle was allowed to settle to the bottom of the kettle where it was drawn off. The molten product was allowed to cool to form a solid mass which was dried and broken up into particulate form. The yield was 111.5%, indicative of complete reaction of monomer as well as termination of the copolymer by p-cymene. The copolymer product was soluble in acetone and 10 grams of the copolymer dissolved in acetone to form 100 milliliters of solution had a viscosity of 0.72 centistoke at 30° C.

Example 2

The preparation of 50% and 75% half-esters of the copolymer of Example 1 and diethylene glycol monobutyl ether are easily prepared by heating the appropriate stoichiometric quantities of the styrene-maleic anhydride copolymer and diethylene glycol monobutyl ether at 150° C. for 2 hours. However, 100% half-esters and higher esters are not so easily prepared. The typical use of strong acid catalysts such as sulfuric acid is effective, but the product must be purified.

The 100% half-ester is prepared by mixing one anhydride equivalent of the copolymer of Example 1 and 1 mol of diethylene glycol monobutyl ether with 2.4 grams of $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder.

Example 3

The 50% and 100% half-esters of Example 2 are each easily dissolved by agitating the same in a water solution containing 1 mol of ammonium hydroxide per equivalent of carboxyl functionality remaining in the partially esterified copolymer. Conveniently, the water solution is heated to 50° C. to facilitate dissolving of the copolymer. By adjusting the proportion of water, solutions containing from 30–75% by weight of dissolved resin solids are easily and directly produced.

To illustrate the extensive difference in the solubility of the 100% half ester of Example 2 and the 100% half esters of conventional copolymers of styrene and maleic anhydride, the 100% diethylene glycol monobutyl ether half ester of a styrene/maleic anhydride copolymer (mol ratio 1/1) having a viscosity in 10% solution in acetone of 8.0 centistokes is prepared and dissolved in water containing sodium hydroxide to provide a solution containing 15% by weight of dissolved resin solids using sufficient sodium hydroxide to provide a pH of 8.0. The Brookfield viscosity measured in centipoises at 24° C. of the 15% sodium hydroxide solution of high molecular weight copolymer partial ester is about 304 centipoises. The corresponding 100% half ester of Example 2 in 15% by weight solution in aqueous sodium hydroxide having a pH of 8.0 is only about 8.8 centipoises, the greatly lowered viscosity demonstrating the gross improvement in aqueous alkaline solubility achieved by the invention.

The water solutions of Example 3 are useful as coatings, forming water resistant films useful as can coatings, in floor polishes which deposit scrubbable films, and for many other purposes as will be indicated hereinafter. In contrast, the conventional copolymers of styrene and maleic anhydride are far more difficult to esterify and the esters are far less soluble in aqueous alkaline medium than are those of the invention. Thus, the invention enables the formulation of aqueous solutions of far higher solids content than could be obtained heretofore and thicker and more resistant coatings can be produced therefrom. Even in dilute solution, the products of the invention are superior to those known heretofore, for the new products have greatly increased penetrating power with respect to porous surfaces. Numerous other important advantages are also obtained such as greatly improved pigment wetting and superior compatibility with other resins in solution.

The 50% half-ester of Example 2 is highly reactive with respect to hydroxyl functionality and can be easily and extensively cross-linked by reaction with polyhydric alcohols such as glycols forming thermoset products. The 100% half-ester of Example 2 provides water resistant thermoplastic films in the absence of glycol cross-linking and, indeed, is relatively inert to hydroxyl functionality in the absence of catalysts.

Example 4

A coplymer containing an unusually large proportion of styrene is made by copolymerizing one mol of maleic anhydride with 2 mols of styrene in the presence of an organic peroxide catalyst. The equipment used in this copolymerization is a 2-liter resin kettle fitted with an electric heating mantle, reflux condenser, thermometer, stirrer and separatory funnel.

To carry out the copolymerization, 633 milliliters of p-cymene are added to the resin kettle and heat is applied to bring the p-cymene to reflux temperature (boiling point 176° C.). Then a previously prepared "Solution A" is added to the resin kettle by incremental addition through the separatory funnel over a period of one hour. Enough heat is applied to the reaction mixture by means of the heating mantle to maintain the reaction temperature at 175–176° C. "Solution A" is maintained at 40–50° C. during the one hour addition period.

"Solution A" is prepared by dissolving 122.75 grams of maleic anhydride in 710 milliliters of p-cymene at 60° C. After filtering, 262 grams of styrene and 12 grams of benzoyl peroxide are added to provide the final "Solution A."

During the addition of "Solution A," a molten mass of copolymer product forms in the kettle. When addition of "Solution A" is complete, the reaction mixture is allowed to cool and additional anhydride copolymer crystallizes out of the solvent phase. The solvent is distilled off leaving a mass of solid copolymer which is mortar mixed, washed with petroleum ether, and then suction filtered. This procedure is repeated until additional purification removes no further solvent. The washed copolymer is then dried in an oven at 110–120° C. The yield is at least stoichiometric indicating complete incorporation of styrene in the copolymer product.

The styrene-maleic anhydride copolymer product made by the above procedure has the following analyses:

Solution viscosity (10% solution in acetone),
  centistokes at 30° C. _____ 0.721
Melting range, ° C. _____ 150–155
Acid number _____ 365

The fact of complete solubility of the copolymer product in aqueous alkaline medium as well as the acid number of the copolymer establishes the absence of styrene homopolymer and the production of a copolymer containing styrene and maleic anhydride in mol proportions of 2:1.

The copolymerization described in Example 4 was repeated a number of times to provide the following average data:

Solution viscosity (10% solution in acetone),
  centistokes at 30° C. _____ 0.70–0.73
Melting range, ° C. _____ 145–155
Acid number _____ 365–370

Example 5

The 100% half-ester is prepared by mixing one anhydride equivalent of the copolymer of Example 4 and 1 mol of diethylene glycol monobutyl ether with 2.4 grams of $LiC_2H_3O_2 \cdot 2H_2O$ in a 2-liter resin kettle fitted with a stirrer and reflux condenser. The mixture is heated in an oil bath at 175° C. for 2 hours. The resulting ester is then sparged with nitrogen for approximately 10 minutes. After cooling, the 100% half-ester is ground to a free-flowing powder.

Example 6

25 parts of the 100% half-ester of Example 5 are agitated in 75 parts of water containing 1 mol of ammonium hydroxide per equivalent of carboxyl functionality remaining in the partially esterified copolymer. The mixture is heated to 50° C. and agitation is continued until the partially esterified copolymer powder is dissolved to provide a 25% by weight solution.

Example 7

Examples 3 and 6 are repeated using corresponding proportions of sodium hydroxide in place of ammonium hydroxide. Corresponding results are obtained.

The water solutions of copolymer partial esters in accordance with the invention are capable of diverse and important utility. To illustrate this utility, the water solutions of Example 3 and Example 6 are useful in combination with wax in the production of floor polishes. These floor polishes, by virtue of the water resistance of the copolymer partial esters of the invention, are unusual in that they do not water spot and can be removed with household ammonia. Moreover, the water solutions of the invention, as typified by the solutions of Examples 3 and 6, are useful as a protective colloid in emulsion coating compositions where they may be used in amounts of from 1–40%. In this capacity, the solutions of the invention may be used with aqueous emulsions in which the dispersed film-forming particles are copolymers of butadiene and styrene, acrylic copolymers, or polyvinyl acetate. The water solutions of the invention also find utility in the coating of paper and as thickening agents to give body to aqueous solutions of organic compounds. The sodium hydroxide solutions corresponding to the ammonium hydroxide solutions of Examples 3 and 6 are also useful as additives to paper finishes to provide a valuable sizing for the paper fibers.

While the foregoing will serve to illustrate the unusual diversity of important utility achieved by the water solutions of the invention, it should be understood that these utilities are merely illustrative and the listing is by no means complete.

Example 8

A partial ester of the copolymer of Example 1 and methoxy polyethylene glycol was prepared by mixing 1.0 mol of the copolymer and 2.0 mols of methoxy polyethylene glycol having a molecular weight of approximately 350 with 1.5% $LiC_2H_3O_2 \cdot 2H_2O$. The mixture is placed in a 2-liter resin kettle fitted with a stirrer, reflux water trap and condenser and heated in an oil bath at 175° C. In the same manner a partial ester was produced from the anhydride copolymer of Example 4. The partial (about 45%) half-ester produced using the copolymer of Example 1 was soluble in water at a concentration of 70% by weight. The partial ester of the copolymer of Example 4 was soluble in water at a concentration of 50%. In contrast, and using 1:1 copolymer of styrene and maleic anhydride of minimum conventional high molecular weight, e.g., having a viscosity in 10% solution in acetone of 8.0 centistokes, the partial (about 45%) half-ester formed with methoxy polyethylene glycol was not soluble in water or in ammonium hydroxide solution as is evidenced by the fact that a 2% by weight solution could not be made.

Further partial esters of styrene-maleic anhydride copolymers with higher molecular weight monohydric polyethylene glycol ethers were prepared in accordance with the present invention. Homogeneous esters as well as esters from mixtures of a monohydroxy polyoxyalkylene glycol and a dissimilar monohydric alcohol were prepared. Conditions are given in Table I. Esterifying alcohols referred to in the table by letter designations A through G are as follows:

(A) Polyethylene glycol monomethyl ether having a molecular weight of about 350.

(B) Ethylene glycol monobutyl ether.

(C) Condensation product of a $C_{15}$ secondary alcohol with ethylene oxide in molar ratio of about 1:12, molecular weight: about 755.

(D) Condensation product of nonylphenol with ethylene oxide in molar ratio of 1:9, molecular weight: about 615.

(E) Condensation product of nonylphenol with ethylene oxide in molar ratio of 1:6, molecular weight: about 485.

(F) Condensation product of nonylphenol with ethylene oxide in molar ratio of 1:9.5, molecular weight: about 595.

(G) Condensation product of nonylphenol with ethylene oxide in molar ratio of 1:100, molecular weight: about 4600.

TABLE I

| Example No. | Styrene-Maleic Anhydride Copolymer Partial Ester | | | | |
|---|---|---|---|---|---|
| | Base Resin | | Esterifying Alcohol | Esterification percent half-ester | Acid No. |
| | Styrene/Maleic Anhydride, molar ratio | Viscosity in Acetone (10% 30° C.), centistokes | | | |
| 9 | 1:1 | 0.67 | A | *80 | 114 |
| 10 | 2:1 | 0.73 | A | *80 | 80 |
| 11 | 2:1 | 0.73 | A | *80 | 98 |
| 12 | 1:1 | 0.67 | B / C | 50 / 5 | 254 |
| 13 | 2:1 | 0.73 | n-Propanol / D | 60 / 15 | 112 |
| 14 | 2:1 | 0.73 | n-Propanol / E | 60 / 15 | 182 |
| 15 | 2:1 | 0.73 | n-Propanol / C | 60 / 5 | 199 |
| 16 | 2:1 | 0.73 | F / G | 10 / 4 | 238 |
| 17 | 2:1 | 0.73 | F | 40 | 141 |
| 18 | 2:1 | 0.73 | n-Propanol / F / G | 50 / 10 / 4 | 173 |

*Dissolved in an excess of esterifying alcohol.

The partially-esterified low molecular weight styrene-maleic anhydride resins of Examples 9–18 exhibited essentially the same improved water-solubility properties over esters of higher molecular weight styrene-maleic anhydride resins as was observed in the foregoing examples.

The esterification process which is employed in accordance with the invention in order to provide the extensive esterification required, without the need for purification, involves the use of metal fatty acid salts. While any metal may be selected, the alkali metals are preferred. Thus, lithium acetate, sodium acetate and potassium acetate are particularly preferred. The particular fatty acid used to form the fatty acid salt is not of primary significance. Thus, the corresponding hexoate or octoate are also useful. While the alkali metal salts are partciularly preferred, other meals may be used, especially zinc and aluminum, such as zinc acetate and aluminum acetate.

It is claimed:

1. A monovinyl aromatic compound-maleic compound copolymer having a molar ratio of polymerized vinyl compound to polymerized maleic compound of about 1:1 to 5:1, containing at least two maleic groups per polymer molecule and about 5 to 75% of the carboxyl carbon atoms of the copolymer being esterified with a monohydroxy polyoxyalkylene glycol having a molecular weight of about 120 to 10,000 and corresponding to the general formula:

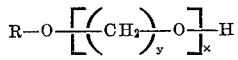

wherein R is selected from the group consisting of alkyl, aryl, aralkyl and alkaryl hydrocarbon radicals of about 1 to 25 carbon atoms, $y$ is about 2 to 6 and $x$ is 2 to 150; a 10% solution in acetone of the unesterified copolymer having a viscosity at 30° C. of up to about 2.0 centistokes.

2. The copolymer of claim 1 wherein a 10% solution in acetone of the unesterified copolymer has a viscosity at 30° C. of up to about 1.0 centistoke.

3. The copolymer of claim 1 wherein the monovinyl aromatic compound is selected from the group consisting of styrene and ring-substituted styrene.

4. The copolymer of claim 3 wherein the monovinyl aromatic compound is styrene.

5. The copolymer of claim 1 wherein the molar ratio of polymerized vinyl compound to polymerized maleic compound is about 1:1 to 3:1.

6. The copolymer of claim 1 wherein the molecular weight of the monohydroxy polyoxyalkylene glycol is above about 250 to about 1200.

7. A styrene-maleic anhydride copolymer having a molar ratio of polymerized styrene to polymerized maleic anhydride of about 1:1 to 3:1, containing at least two maleic groups per polymer molecule and about 5 to 75% of the carboxyl carbon atoms of the copolymer being esterified with a monohydroxy polyoxyalkylene glycol corresponding to the general formula:

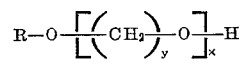

wherein R is selected from the group consisting of aryl, aralkyl, alkyl and alkaryl hydrocarbon radicals of about 1 to 25 carbon atoms, $y$ is about 2 to 6 and $x$ is 2 to 150, said monohydroxy polyoxyalkylene glycol having a molecular weight of aobut 120 to 10,000; a 10% solution in acetone of the unesterified copolymer having a viscosity at 30° C. of up to about 1.0 centistoke.

8. The copolymer of claim 7 wherein the monohydroxy polyoxyalkylene glycol is a lower alkoxy polyoxyethylene glycol and $x$ is 4 to 20.

9. The copolymer of claim 8 wherein the lower alkoxy polyoxyethylene glycol has a molecular weight above about 250 to about 1200.

10. The copolymer of claim 9 wherein the lower alkoxy polyoxyethylene glycol is methoxy polyoxyethylene glycol.

11. The copolymer of claim 10 wherein the methoxy polyoxyethylene glycol has a molecular weight of about 300 to 400.

References Cited

UNITED STATES PATENTS 3,207,718   9/1965   Zimmerman et al. __ 260—78.5

FOREIGN PATENTS 621,179   6/1963   Belgium.

JOSEPH L. SCHOFER, *Primary Examiner.*

J. KIGHT, *Assistant Examiner.*